United States Patent
Tajima et al.

(10) Patent No.: US 6,702,874 B2
(45) Date of Patent: Mar. 9, 2004

(54) GAS SEPARATION APPARATUS AND GAS SEPARATION METHOD

(75) Inventors: Yoshinori Tajima, Tokyo (JP); Takashi Futatsuki, Tokyo (JP)

(73) Assignee: Organo Corporation, Tokyo (JP)

(*) Notice: Subject to any disclaimer, the term of this patent is extended or adjusted under 35 U.S.C. 154(b) by 0 days.

(21) Appl. No.: 10/045,269

(22) Filed: Nov. 7, 2001

(65) Prior Publication Data
US 2002/0059863 A1 May 23, 2002

(30) Foreign Application Priority Data
Nov. 10, 2000 (JP) ........................................ 2000-343678

(51) Int. Cl.⁷ ........................ B01D 15/08; B01D 53/04
(52) U.S. Cl. ........................ 95/86; 95/131; 95/142; 96/104; 96/121; 96/130; 96/143
(58) Field of Search ........................ 73/23.35, 23.39; 95/82, 86, 96, 97, 102, 128, 131, 142; 96/101, 104, 121, 130, 133, 143, 144

(56) References Cited

U.S. PATENT DOCUMENTS

| | | | | |
|---|---|---|---|---|
| 3,121,321 A | * | 2/1964 | Karasek | 73/23.24 |
| 3,125,425 A |  | 3/1964 | Richmond | 55/22 |
| 3,515,262 A | * | 6/1970 | Ayers et al. | 95/82 |
| 3,537,237 A | * | 11/1970 | Gardner | 95/82 |
| 3,537,297 A | * | 11/1970 | Loyd et al. | 73/23.35 |
| 3,550,429 A | * | 12/1970 | MacMurtrie et al. | 73/23.25 |
| 3,893,827 A | * | 7/1975 | Leppard | 95/96 |
| 4,254,062 A |  | 3/1981 | Wambach et al. | 570/211 |
| 4,434,051 A | * | 2/1984 | Golem | 210/262 |
| 4,443,231 A | * | 4/1984 | Siegell | 55/3 |
| 5,069,887 A | * | 12/1991 | Suenaga et al. | 55/71 X |
| 5,502,969 A |  | 4/1996 | Jin et al. | 62/11 |
| 5,720,797 A | * | 2/1998 | Yates et al. | 95/96 |
| 5,759,237 A | * | 6/1998 | Li et al. | 95/41 |
| 5,814,127 A | * | 9/1998 | Li | 95/47 |
| 5,919,285 A | * | 7/1999 | Li et al. | 95/45 |
| 5,976,222 A | * | 11/1999 | Yang et al. | 95/45 |
| 6,004,377 A | * | 12/1999 | Tamata et al. | 95/82 |
| 6,017,382 A | * | 1/2000 | Ji et al. | 95/103 |
| 6,032,484 A |  | 3/2000 | Chernyakov et al. | 62/624 |
| 6,187,077 B1 | * | 2/2001 | Li | 95/47 |
| 6,224,677 B1 | * | 5/2001 | Nozawa et al. | 95/131 X |
| 6,277,173 B1 | * | 8/2001 | Sadakata et al. | 95/12 |
| 6,325,841 B1 | * | 12/2001 | Otsuka et al. | 95/132 |
| 6,454,837 B1 | * | 9/2002 | Pittroff et al. | 95/47 |
| 6,497,138 B1 | * | 12/2002 | Abdel-Rahman et al. | 73/23.42 |

FOREIGN PATENT DOCUMENTS

| | | | | |
|---|---|---|---|---|
| EP | 0 500 040 A1 | 8/1992 | | B01D/53/02 |
| EP | 0 854 335 A2 | 7/1998 | | F25J/3/02 |
| EP | 0 924 485 A1 | 6/1999 | | F25J/3/02 |
| EP | 0 948 988 A1 | 10/1999 | | B01D/53/04 |
| WO | WO 99/33540 | 7/1999 | | B01D/15/08 |

OTHER PUBLICATIONS

European Search Report dated May 31, 2002, 4 pages.

* cited by examiner

Primary Examiner—Robert H. Spitzer
(74) Attorney, Agent, or Firm—Rosenthal & Osha L.L.P.

(57) ABSTRACT

Using a distillation separator, a gas to be treated is separated into a plurality of gas groups having different boiling points. Then, the specific gases included in each of the plurality of gas groups separated at the first separator and having similar boiling points are separated using a chromatographic separator. In this manner, specific gases can be separated from the gas to be treated containing a plurality of specific gases.

21 Claims, 2 Drawing Sheets

GAS SEPARATION APPARATUS AND GAS SEPARATION METHOD

BACKGROUND OF THE INVENTION

1. Field of the Invention

The present invention relates to a gas separation apparatus and gas separation method for separating specific gases from a gas to be treated which contains a plurality of specific gases.

2. Description of the Related Art

Conventionally, various gases are used in semiconductor manufacturing processes depending on the particular process adopted. For example, perfluoro compound (PFC) gas which is a mixture containing fluorine compounds such as $CF_4$, $NF_3$, $C_2F_6$, $C_3F_8$, $SF_6$, and $CHF_3$ is used as a reaction gas at the dry etching process or at the cleaning process for a thin film forming device. In these processes, a discharge gas is produced which contains the PFC gas.

Because these discharge gases such as PFC promote global warming and thus cannot be discharged out of the line without further processing, various methods are employed for treating these gases. The treating methods include (i) decomposition in which the PFC gas is decomposed by combustion, catalyst heating, or plasma decomposition; (ii) membrane separation in which these materials are separated by a membrane; (iii) distillation separation by subzero cooling in which the separation is achieved taking advantage of the difference in the boiling points of the gases; and (iv) chromatographic separation in which separation is achieved by taking advantage of the difference in time for passing through a chromatographic column.

However, in the decomposition method (i), there are shortcomings in that a complete decomposition is difficult and the gas cannot be recovered for reuse because the gas is decomposed and discharged. In the membrane separation (ii), although nitrogen in the discharge gas can be removed, the separation between PFC gases is difficult. In the subzero cooling separation method (iii), separation between gases which only have a small difference in the boiling points, such, for example, as $CF_4$ and $NF_3$ with the difference being only 1° C., is difficult. In a conventional PFC recovery device employing the subzero cooling separation method, when recovering a mixture gas of $CF_4$ and $NF_3$, $NF_3$ must first be decomposed and the remaining $CF_4$ alone is then recovered. However, the trouble with this method is that $NF_3$ which is the most expensive gas among the PFC gases cannot be recovered. In the chromatographic separation (iv), there is a problem that when three or more PFC gases are present, these gases cannot simultaneously be separated and recovered.

SUMMARY OF THE INVENTION

The present invention has been conceived to overcome the shortcomings of the conventional gas treatment methods mentioned above, and one object of the present invention is to provide a gas separation device and gas separation method capable of separating a mixture gas having a plurality of constituents, in particular, three or more constituents, inexpensively and with high purity.

According to the present invention, a mixture gas to be treated containing a plurality of gas constituents is first separated by distillation separation into a plurality of gas constituent groups, each of which group has similar boiling points, and then the specific gases within each of separated gas constituent groups are separated by chromatographic separation. In this manner, a mixture gas having a plurality of constituents, in particular, three constituents or more, can be separated inexpensively and with high purity.

For example, when a mixture gas having a plurality of gas constituents includes $CF_4$, $NF_3$, $C_2F_6$, and $CHF_3$, and nitrogen is an additional gas constituent, the gases can be separated by distillation separation into a first gas group which includes $CF_4$ (having a boiling point of $-128°C$.) and $NF_3$ (having a boiling point of $-128.8°C$.), a second gas group which includes $C_2F_6$ (having a boiling point of $-78°C$.) and $CHF_3$ (having a boiling point of $-82.2°C$.), and a third gas group which includes nitrogen (having a boiling point of $-95°C$.). Then, by chromatographic separation, the mixture gas of the first gas group can be separated into $CF_4$ and $NF_3$. The mixture gas of the second gas group can similarly be separated by chromatographic separation into $C_2F_6$ and $CHF_3$. The separated gases of $CF_4$, $NF_3$, $C_2F_6$, and $CHF_3$ can respectively be recovered for reuse.

DESCRIPTION OF PREFERRED EMBODIMENT

Figure 1:
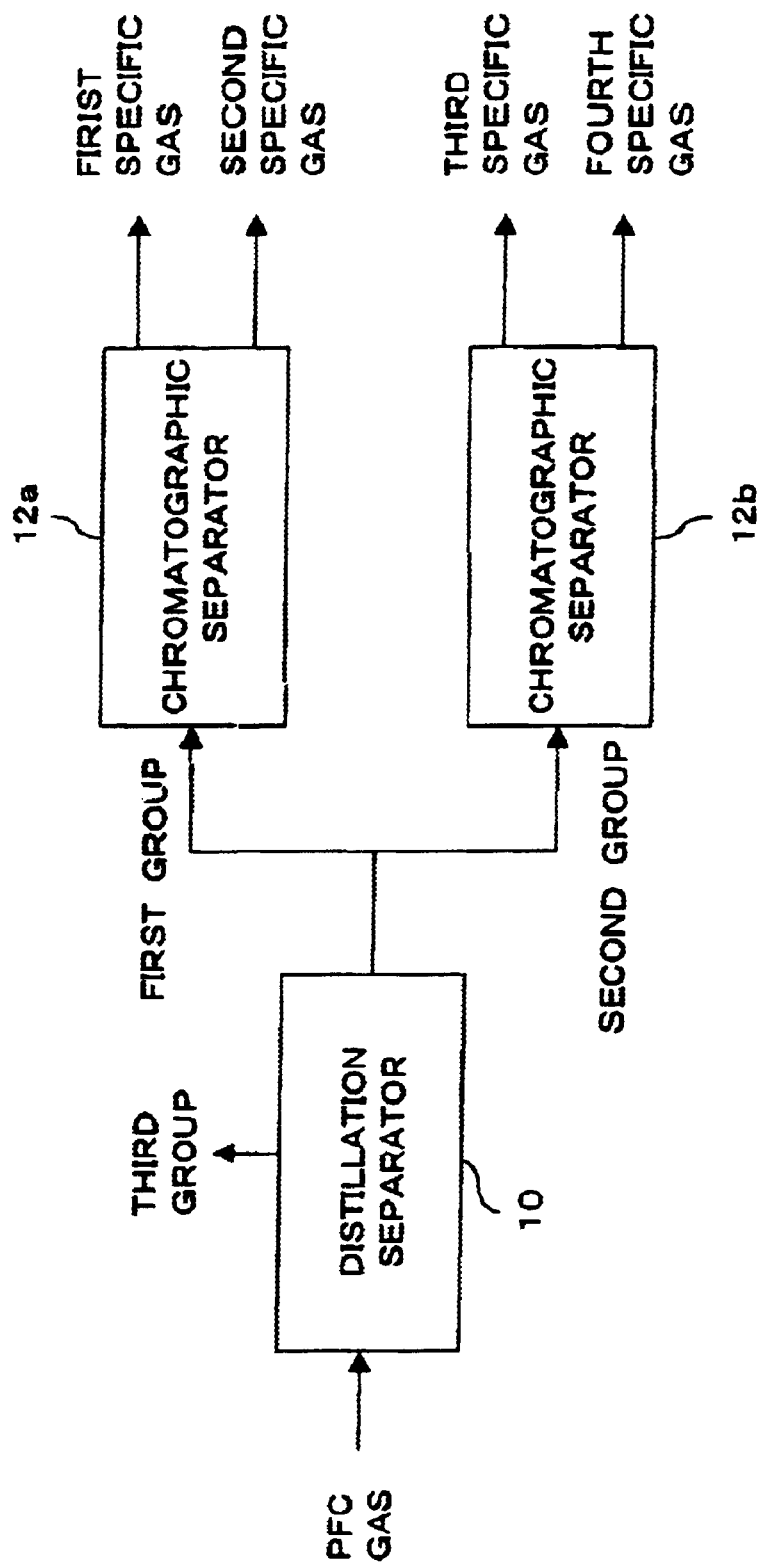
FIG. 1 is a block diagram showing the structure of a device according to the present invention.

In the present invention, the plurality of specific gases are, for example, PFC gases discharged from a semiconductor manufacturing process. The PFC gases include any one of a fluorine compound having at least one of the elements C, N, and S as the constituting element. Specifically, examples of PFC gases include $CF_4$, $NF_3$, $C_2F_6$, $C_3F_8$, $SF_6$, and $CHF_3$. The present invention is particularly effective when the PFC gases include at least the following three constituents: $CF_4$, $NF_3$, and $C_2F_6$ or $CHF_3$ or when the PFC gases include at least the following three constituents: $C_2F_6$, $CHF_3$, and $CF_4$ or $NF_3$. The present invention is especially effective for separation of PFC gases containing both $CF_4$ and $NF_3$ which have similar boiling points or for separation of PFC gases containing both $C_2F_6$ and $CHF_3$ which have somewhat similar boiling points. The gas to be treated usually contains 0.1% to several percent PFC gas and nitrogen as the remainder gas.

The gas to be treated is first introduced to distillation separator 10 for separating the gases by distillation separation into a plurality of gas constituent groups each of which group has similar boiling points. As the distillation separator 10, any known device which uses a distillation column can be used. That is, in the distillation column, gas constituents included in the gas to be treated are cooled to respective boiling points and liquefied to form a gas-liquid state so that separation and purification can be performed. For example, a mixture gas of two constituents having similar boiling points can be grouped as one group, and PFC gases can be separated and purified into a plurality of groups. More specifically, the gas to be treat is distillation separated into three gas groups, that is, $CF_4$ and $NF_3$ each of which has a boiling point near $-128°C$. constituting a first group, $C_2F_6$ and $CHF_3$ which have boiling points of $-78°C$. and $-82.2°C$., respectively, constituting a second group, and nitrogen having a boiling point of $-195°C$. constituting a third group. The separated first gas group and second gas group are then each chromatographically separated into high purity specific gases by chromatographic separators 12a and 12b provided downstream of the distillation separator. Nitrogen in the third gas group is recovered and reused. In the distillation separator 10, it is possible to further obtain fourth, fifth, etc. gas groups depending on the composition of gas constituents in the mixture gas to be treated.

The first and second gas groups separated at the distillation separator 10 are then respectively introduced to chromatographic separators 12a and 12b for separating the specific gases constituting each gas group and having similar boiling points, by chromatographic separation. That is, in the first group, a first specific gas (e.g. $CF_4$) and a second specific gas (e.g. $NF_3$) are separated and in the second gas group, a third specific gas (e.g. $C_2F_6$) and fourth specific gas (e.g. $CHF_3$) are separated. Because the chromatographic separation operation is similar for both gas groups, the chromatographic separation operation will be described below for separation of $CF_4$ and $NF_3$ in the first gas group.

As the chromatographic separators 12a and 12b, any known chromatographic separator having a column filled with a given filler can be used. The first gas group is passed through the separator 12a. In this manner, this first gas group is separated into its constituents because the constituents have different retention times due to a difference in the affinity of the gas constituents with respect to the filler. As a filler, for example, silica gel or molecular sieve can be used for separating $CF_4$ and $NF_3$. In the chromatographic separators 12a and 12b, nitrogen is used as a carrier gas and $CF_4$ and $NF_3$ are separated by sequentially desorbing and discharging $CF_4$ these gas constituents adsorbing onto the filler.

When a mixture gas fraction having both $CF_4$ and $NF_3$ is obtained from the separator 12a, it is preferable to return this fraction to the inlet side. For example, while passing the carrier gas, which is the nitrogen gas, a predetermined amount of mixture gas fraction can be mixed into the nitrogen gas, and a fraction containing $CF_4$ and a fraction containing $NF_3$ can be separately collected.

Figure 2:
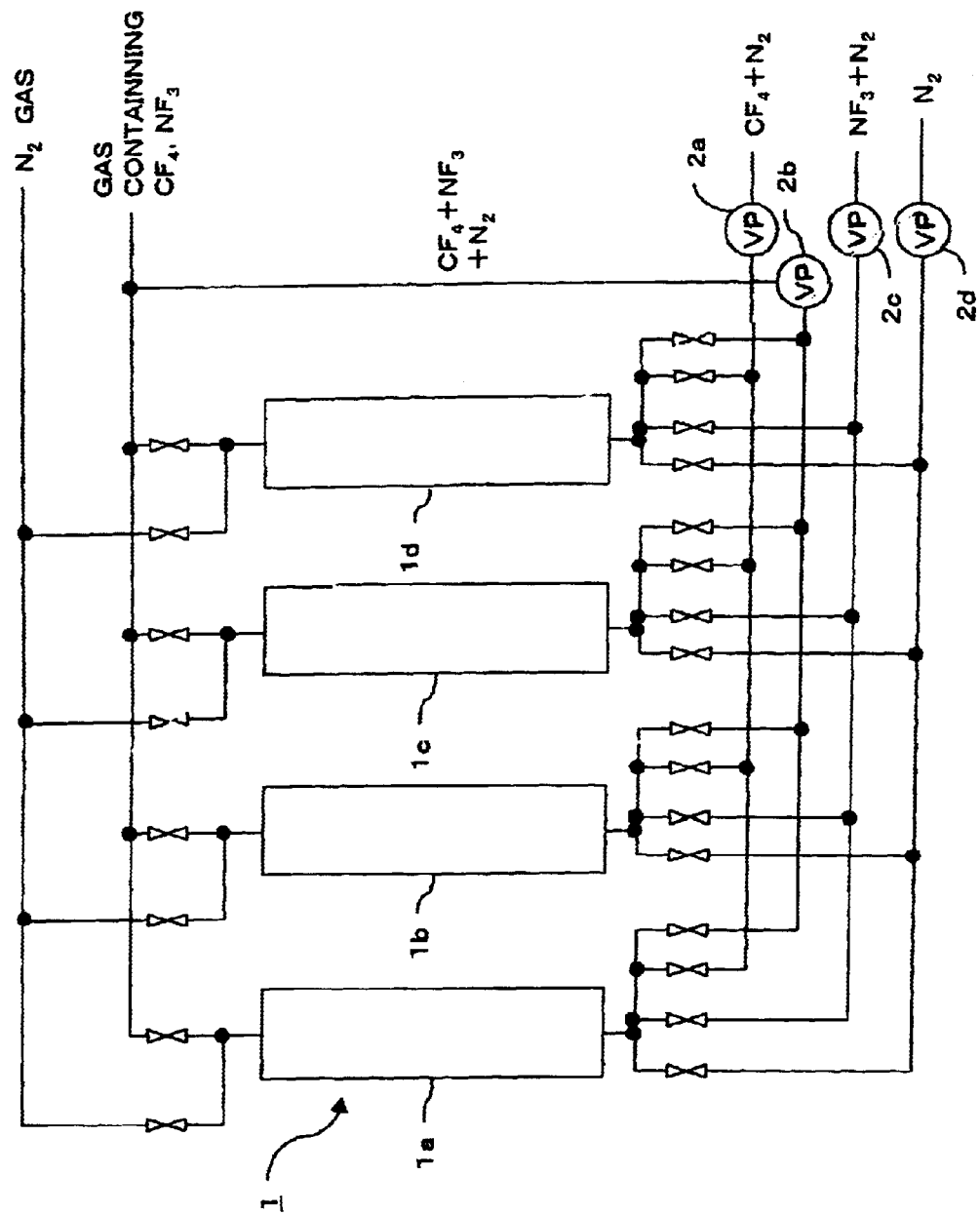
FIG. 2 is a diagram showing the structure of a chromatographic separator according to the present invention.

It is also preferable to provide a plurality of columns in the chromatographic separator 12a (or 12b) to form a simulated-moving fed type chromatographic separator in which the first gas group is supplied to each column in sequence and each fraction is collected from each column in sequence. FIG. 2 shows a configuration example of a simulated-moving feed type chromatographic separator 1 in which four columns 1a, 1b, 1c, and 1d are provided, and fractions are obtained by supplying the first gas group to the columns in sequence. For example, nitrogen can be continuously supplied to the columns 1a, 1b, 1c, and 1d as a carrier gas, and the first gas group can be introduced to the columns in sequence by switching, in sequence, the feed gas inlet valve in the downstream direction. Because gas of nitrogen, gas of $CF_4$ and nitrogen, gas of $CF_4$, $NF_3$ and nitrogen, and gas of $NF_3$ and nitrogen flow out from each of the columns 1a, 1b, 1c, and 1d, in that order, the gases can be separated and discharged by switching a valve at the exit side in sequence and driving corresponding one of vacuum pumps 2a, 2b, 2c, and 2d. The mixture fraction containing both $CF_4$ and $NF_3$ is circulated to and joined with the feed first gas group. In this manner, gas of nitrogen, gas of $CF_4$ and nitrogen, and gas of $NF_3$ and nitrogen are obtained at the exit of the chromatographic separator.

It is preferable to perform collection of the gas for each constituent at the exit of the chromatographic separator and the stitching of the valves in a simulated-moving feed type chromatographic separator 1 in FIG. 2 based on control conditions which are set based on the gas composition of the first gas group or the performance of the filler, or an analysis result of the gas at the exit. When the gas collection and valve switching are performed based on the analysis result of the gas at the exit, gas constituents can be detected using, for example. differential thermal detector (TCD) or Fourier transform-infrared analyzer (FT-IR), and the control can be performed based on the analysis. With this process, the gas is separated into its constituents, and thus, in the fractions for $CF_4$ and nitrogen, and for $NF_3$ and nitrogen, a pure mixture can be obtained with almost no other materials present.

The obtained fraction of $CF_4$ and nitrogen and the obtained fraction of $NF_3$ and nitrogen are supplied to concentrators as necessary. As the concentrator, it is preferable to use a membrane separator or a subzero cooling device. In particular, by circulating the concentrated gas several times in a membrane separator or by using a multiple-step membrane separator, almost 100% of nitrogen can be separated, leaving a pure, 100% concentration of $CF_4$ gas and $NF_3$ gas. The $CF_4$ gas and $NF_3$ gas can then be recovered and reused, for example, at the dry etching process or cleaning process of a thin film forming device in the semiconductor manufacturing process.

The above chromatographic separation by the chromatographic separator and concentration by concentrator which is optional treatment means are also similarly performed on the second gas group. In this manner, pure, 100% concentration of $C_2F_6$ gas and $CHF_3$ gas can be obtained. Similar to the gases in the first gas group, $C_2F_6$ gas and $CHF_3$ gas can be recovered and reused, for example, at the dry etching process or cleaning process of a thin film forming device in the semiconductor manufacturing process.

In the embodiment, by performing the upstream distillation separation, the gas to be treated which contains, for example, four specific gases $CF_4$, $NF_3$, $C_2F_6$, and $CHF_3$, and another gas, nitrogen, can be separated into three gas groups having different boiling points. Among the three gas groups, each of two gas groups is a mixture gas of two gas constituents. Thus, by further using chromatographic separators, $CF_4$ and $NF_3$, and $C_2F_6$ and $CHF_3$, which are each difficult to be separated by other separation methods, can reliably be separated. The separated gases of $CF_4$, $NF_3$, $C_2F_6$, and $CHF_3$ can then be recovered and reused.

As another embodiment, in a case where the gas to be treated contains three specific gases, $CF_4$, $NF_3$, and $C_2F_6$ or $CHF_3$, and another gas, nitrogen, by performing the upstream distillation separation, the gas to be treated can be separated into three gas groups with different boiling points, the first gas group including $CF_4$ and $NF_3$, the second group including $C_2F_6$ or $CHF_3$, and the third group including nitrogen. Among the three gas groups, the mixture gas of $CF_4$ and $NF_3$ can be separated into $CF_4$ and $NF_3$ using a chromatographic separator for separating the specific gases. When the gas to be treated contains three specific gases, $C_2F_6$, $CHF_3$, and $CF_4$ or $NF_3$, and another gas, nitrogen, by performing the upstream distillation separation, the gas to be treated can be separated into three gas groups with different boiling points, the first gas group including $C_2F_6$ and $CHF_3$, the second gas group including $CF_4$ or $NF_3$, and the third gas group including nitrogen. Among the three gas groups, the mixture gas of $C_2F_6$ and $CHF_3$ can be separated into $C_2F_6$ and $CHF_3$ by further using a chromatographic separator for separating the specific gases.

Other examples of PFC gases include $C_3F_8$ and $SF_6$, in addition to $CF_4$, $NF_3$, $C_2F_6$, and $CHF_3$. The former PFC gases can be separated relatively easily by various means. For example, $C_3F_8$ (having a boiling point of −36.7° C.) can be separated in the above example as a fourth gas group in the distillation separator. $SF_6$ (having a sublimation temperature of −63.8° C. and melting point of −50.8° C.) obtained in the chromatographic separators 12a and 12b as a fraction that is further apart. Thus, fractions containing $SF_6$ can be separated from the fraction that is separated as nitrogen in the above example.

Also, nitrogen is obtained at the distillation separator, chromatographic separator, and concentrators. Nitrogen, on the other hand, is necessary as a diluting gas introduced before a vacuum pump in order to dilute hydrogen fluoride in the discharge gas from the semiconductor manufacturing process, and as the carrier gas for the chromatographic separator. It is therefore preferable to reuse the obtained nitrogen.

It is highly probable that the nitrogen gas to be reused contains very small amounts of PFC gases. Therefore, it is preferable to treat the nitrogen gas to remove the very small amounts of PFC gases within the nitrogen gas to be reused. As the process, it is preferable to employ a known method for decomposing the PFC gases, such as, for example, plasma decomposition process, combustion, and catalyst heating process, or to repeat the distillation separation and chromatographic separation, to separate the PFC gases and increase the purity of nitrogen.

EXAMPLE 1

As a sample discharge gas, nitrogen gas was prepared which contained 1% each of $CF_4$, $NF_3$, $C_2F_6$, and $CHF_3$ (volume percent). The sample discharge gas was introduced to a known distillation column where distillation operation was performed to separate the discharge gas into a first gas group containing $CF_4$ and $NF_3$, second gas group containing $C_2F_6$ and $CHF_3$, and third gas group containing nitrogen. The concentration of $CF_4$ in the first gas group was 50%, the concentration of $NF_3$ in the first gas group was 50%, the concentration of $C_2F_6$ in the second gas group was 50%, and the concentration of $CHF_3$ in the second gas group was 50%.

The first gas group was passed through a chromatographic separator which uses a column filled with silica gel and nitrogen as the carrier gas. As a result, gas of $CF_4$ and gas of $NF_3$ were separated and discharged in that order at the separator column exit, due to the difference in the retention times. The purity of each gas was 100%.

Similarly, the second gas group was passed through a chromatographic separator which uses a column filled with silica gel and nitrogen as the carrier gas. As a result, gas of $C_2F_6$ and gas of $CHF_3$ were separated and discharged in that order at the separator column exit, due to the difference in the retention times. The purity of each gas was 100%.

An analysis of nitrogen obtained at the distillation separator 10 and chromatographic separators 12a and 12b indicated that the nitrogen gas contained 10 ppm of PFC gas. The PFC gas was decomposed to a concentration of 0 ppm and neutralized by applying a plasma decomposition process to the obtained nitrogen. It was thus confirmed that the obtained nitrogen gas is usable as a diluting gas before the vacuum pump for diluting hydrogen fluoride within the discharge gas of the semiconductor manufacturing plant or as a carrier gas for the chromatographic separator.

According to the embodiment, by performing the upstream distillation separation, the gas to be treated which contains a plurality of specific gases and nitrogen as another gas can be separated into at least three gas groups with different boiling points, including at least one group containing two gas constituents of which the boiling points are similar. Using the chromatographic separation for separating specific gases, the plurality of mixture gases can then be reliably separated into each constituent, the constituents being difficult to be separated by other methods, such as, for example, $CF_4$ and $NF_3$, and $C_2F_6$ and $CHF_3$. In other words according to the present invention, a plurality of constituents, in particular, three or more PFC gas constituents, that cannot be separated by a single separation method such as distillation separation or chromatographic separation, can be separated inexpensively and in high purity. The separated $CF_4$, $NF_3$, $C_2F_6$, and $CHF_3$ can be recovered and reused.

What is claimed is:

1. A gas separation method for separating at least two specific gases from a gas to be treated containing a plurality of specific gases, said method comprising the steps of:
   a first separation step for separating said gas to be treated into gas groups having different boiling points by distillation separation; and
   a second separation step for separating the at least two specific gases by performing chromatographic separation on at least one gas group that is separated through distillation at the first separation step,
   wherein the second separation step comprises sequentially supplying a plurality of chromatographic columns with the at least one gas group by switching an inlet valve for each of the plurality of chromatographic columns and sequentially collecting the at least two specific gases from the plurality of chromatographic columns by switching a plurality of outlet valves,
   wherein, for at least one of the plurality of chromatographic columns, the plurality of outlet valves comprises a first outlet valve, a second outlet valve, and a third outlet valve,
   wherein, a first gas of the at least two specific gases is collected from the first outlet valve, a second gas of the at least two specific gases is collected from the second outlet valve, and a mixture gas of the at least two specific gases is collected from the third outlet valve.

2. A gas separation method according to claim 1, wherein in said second separation step, specific gases from the plurality of specific gases that have similar boiling points are chromatographically separated.

3. A gas separation method according to claim 1, wherein said gas to be treated contains PFC gases discharged from a semiconductor manufacturing process as the specific gases and nitrogen as another gas.

4. A gas separation method according to claim 3, wherein said PFC gases include fluorine compounds having at least one element of C, N, and S as the constituting element.

5. A gas separation method according to claim 4, wherein said PFC gases include at least $CF_4$ and $NF_3$.

6. A gas separation method according to claim 5, wherein said $CF_4$ and $NF_3$ are separated into the same gas group at said first separation step and are separated from each other at said second separation step.

7. A gas separation method according to claim 4, wherein said PFC gases include at least $C_2F_6$ and $CHF_3$.

8. A gas separation method according to claim 7, wherein said $C_2F_6$ and $CHF_3$ are separated into the same gas group at said first separation step and are separated from each other at said second separation step.

9. A gas separation method according to claim 1, wherein, for the at least one of the plurality of chromatographic columns, the plurality of outlet valves comprises a fourth outlet valve, wherein a carrier gas is collected from the fourth outlet valve.

10. A gas separation method according to claim 1, wherein the mixture gas is returned to an inlet of the at least one of the plurality of chromatographic columns.

11. A gas separation apparatus for separating at least two specific gases from a gas to be treated which contains a plurality of specific gases, said apparatus comprising:

a first separator for separating said gas to be treated into gas groups having different boiling points by distillation separation; and a second separator for separating the at least two specific gases by performing chromatographic separation on at least one gas group separated by said first separator, wherein the second separator comprises a plurality of chromatographic columns, wherein the plurality of chromatographic columns each comprises at least one inlet valve and a plurality of outlet valves arranged such that the at least one gas group is sequentially supplied to the plurality of chromatographic columns by switching at least one inlet valve and the at least two specific gases are sequentially collected from the plurality of chromatographic columns by switching the plurality of outlet valves, wherein, for at least one of the plurality of chromatographic columns, the plurality of outlet valves comprises a first outlet valve, a second outlet valve, and a third outlet valve, wherein, the first outlet valve discharges first gas of the at least two specific gases, the second outlet valve discharges a second gas of the at least two specific gases, and the third outlet valve discharges a mixture gas of the at least two specific gases.

12. A gas separation apparatus according to claim 11, wherein said second separator chromatographically separates specific gases from the plurality of specific gases that have similar boiling points.

13. A gas separation apparatus according to claim 11, wherein said gas to be treated contains PFC specific gases discharged from a semiconductor manufacturing process as the specific gases and nitrogen as another gas.

14. A gas separation apparatus according to claim 13, wherein said PFC gases contain fluorine compounds having at least one element of C, N, and S as the constituting element.

15. A gas separation apparatus according to claim 14, wherein said PFC gases include at least $C_2F_6$ and $CHF_3$.

16. A gas separation apparatus according to claim 15, wherein said $C_2F_6$ and $CHF_3$ are separated into the same gas group as said first separator and are separated from each other at said second separator.

17. A gas separation apparatus according to claim 13, wherein said PFC gases include at least $CF_4$ and $NF_3$.

18. A gas separation apparatus according to claim 17, wherein said $CF_4$ and $NF_3$ are separated into the same gas group at said first separator and are separated from each other at said second separator.

19. A gas separation apparatus according to claim 11, wherein the plurality of chromatographic columns are supplied with a feed gas which is sequentially switched among the plurality of chromatographic columns thereby sequentially changing the function of each column, wherein the feed gas is a mixture of the at least one gas group and the mixture gas of the at least two specific gases.

20. A gas separation apparatus according to claim 11, wherein, for the at least one of the plurality of chromatographic columns, the plurality of outlet valves comprises a fourth outlet valve, wherein the fourth outlet valve discharges a carrier gas.

21. A gas separation apparatus according to claim 11, wherein the mixture gas is returned to an inlet of the at least one of the plurality of chromatographic columns.

* * * * *